(12) United States Patent
Alexander et al.

(10) Patent No.: US 8,141,097 B2
(45) Date of Patent: Mar. 20, 2012

(54) TEST MANAGEMENT SYSTEM AND METHOD

(75) Inventors: Stefan Alexander, Leipzig (DE); Jason F. Basler, Los Gatos, CA (US); Neeta Garimella, San Jose, CA (US); Clemens Kalbfuss, Mainz (DE); Dale Mark Mock, San Jose, CA (US); Frank Albert Mueller, Moerfelden-Walldorf (DE)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/331,478

(22) Filed: Dec. 10, 2008

(65) Prior Publication Data

US 2010/0146514 A1    Jun. 10, 2010

(51) Int. Cl.
  *G06F 15/00* (2006.01)
  *G06F 9/00* (2006.01)
(52) U.S. Cl. ....................................... 718/105
(58) Field of Classification Search ........................ None
  See application file for complete search history.

(56) References Cited

U.S. PATENT DOCUMENTS

| | | | |
|---|---|---|---|
| 922,832 A | | 5/1909 | Xavier |
| 6,031,990 A | * | 2/2000 | Sivakumar et al. ........... 717/124 |
| 6,425,096 B1 | | 7/2002 | Liese et al. |
| 7,181,523 B2 | | 2/2007 | Sim |
| 7,454,659 B1 | * | 11/2008 | Gaudette et al. ................ 714/33 |
| 2003/0131088 A1 | | 7/2003 | Morrissey et al. |
| 2005/0125188 A1 | * | 6/2005 | Eden et al. .................... 702/121 |
| 2010/0146514 A1 | * | 6/2010 | Alexander et al. ............ 718/104 |

* cited by examiner

*Primary Examiner* — Corey S Faherty
(74) *Attorney, Agent, or Firm* — McGinn Intellectual Property Law Group, PLLC

(57) ABSTRACT

An execution management method includes providing an execution plan, balancing an execution load across a plurality of servers, automatically interpreting the execution plan, and re-driving a failed test to another of the plurality of servers if the test case fails on an originally selected available server. The execution plan includes a plurality of test cases and criteria corresponding to the test cases. More than one of the plurality of test cases may be run on each of the plurality of servers at a same time in parallel. Each of the plurality of servers is run independently.

1 Claim, 12 Drawing Sheets

```xml
<?xml version='1.0'?>
<!DOCTYPE jobs SYSTEM "tat_job.dtd">
<jobs>
   <job>
      <id>E13A4BCE68436</id>
      <scenario>ADOA01</scenario>
      <platform_code>arvid</platform_code>
      <client>BA</client>
      <tester>Stefan Tomm</tester>
      <client_driver>0118 FA</client_driver>
   </job>
   <job>
      <id>AFG64B5R487DA</id>
      <scenario>CALLMT</scenario>
      <platform_code>onyxia</platform_code>
      <client>API</client>
      <tester>Stefan Tomm</tester>
      <client_driver>0118 FA</client_driver>
   </job>
</jobs>
```

FIGURE 6

TEST MANAGEMENT SYSTEM AND METHOD

BACKGROUND OF THE INVENTION

1. Field of the Invention

The present invention generally relates to a method and apparatus for test management and more particularly to a test management method and system providing intelligent load balancing and enhanced scheduling capabilities.

2. Description of the Related Art

Test management systems typically include one or more components implemented in a single system or multiple systems. The components include a test case code repository, execution agents that allow tests to be executed on remote systems, the notion of a test plan and or schedule, which defines properties such as which tests to run, which environments, and when to run the tests, and execution records, which retain information related to the results of executed test cases.

Automated Built and Test (ABAT) is a server-client principle where the server provides a web-GUI where jobs can be submitted. The client runs on the hardware where the jobs are done. These submitted jobs define, for example, a test case and a machine where the job must be executed. ABAT is a framework, which provides sequential run-possibilities on a single hardware.

Grid Access Manager software delivers a virtualization and data-protection layer that creates a unified, fixed-content storage interface across multiple facilities and heterogeneous storage hardware.

A problem in the test of a product that is available on multiple platforms is to fulfill the coverage within a short time frame.

For example, consider that a product is available for xLinux and a test bucket consists of 20 test cases, which need to pass in order to ship the product. Accordingly, there are 20 test cases for one platform. A platform can run with different operating systems (e.g. SLES 9/10 and RIEL 4/5). That means there 80 (4×20=80) test cases. A platform can operate in 32 & 64 bit modes. Accordingly, 2×80=160 test cases. Furthermore, on each operating system three file systems are supported for which each test must be executed against. Accordingly, there are 480 (3×160=480) test cases. Therefore, there is a growth from 20 to 480 test cases.

To test such a huge amount of test cases, multiple hardware of each platform must be available regularly. The selection of a corresponding hardware and the initial setup is very time consuming with such a set of hardware. It is necessary to have an automated process, which, on the one hand, selects the corresponding hardware and, on the other hand, balances the load of a set of test cases to several hardware which is multiple available. That is, the process must be able to divide and distribute one bucket to several machines, which spares time to complete and fulfill coverage.

There is a need for a system which manages the execution of a very complex test schedule against a farm of test systems.

SUMMARY OF THE INVENTION

In view of the foregoing and other exemplary problems, drawbacks, and disadvantages of the conventional methods and structures, an exemplary feature of the present invention is to provide a method and structure that manages the execution of a very complex test schedule against a pool of test systems.

In a first exemplary, non-limiting aspect of the present invention, an execution management method for testing a product on a plurality of platforms includes providing an execution plan, the execution plan including a plurality of test cases and criteria corresponding to each of the plurality of test cases, the criteria including system attributes and user defined attributes, balancing an execution load across a plurality of servers, the load balancing including automatically distributing the plurality of test cases to the plurality of servers, automatically interpreting the execution plan, the automatically interpreting including automatically searching for the available server, the available server is selected based on the automatically searching, and re-driving a failed test to another of the plurality of servers if the test case fails on an originally selected available server. The distributing includes selecting an available server from a plurality of servers, the available server meeting the criteria of the execution plan, for testing at least one of the plurality of test cases, the selecting an available server comprising matching attributes of a server with the criteria of the execution plan, reserving the available server to prevent contention from other test cases, locking at least one of the plurality of servers, whereby if a server is locked, then the server is dedicated to a single test case, and if the server is unlocked, then a plurality of test cases may be run on the server, and automatically unlocking a selected server once a test case has been tested on the selected server. More than one of the plurality of test cases may be run on each of the plurality of servers at a same time in parallel. Each of the plurality of servers is run independently.

According to certain exemplary aspects, the claimed invention provides a test management system (and method), which provides two advantageous components. The two advantageous components include a Master controller and execution agents, which can be deployed on a farm of test servers. The system includes a client-server concept where the Task Automation Tool (TAT) Master is the controller and the TAT Daemon is the execution agent.

The load balancing is achieved by selecting an available system from a server pool, which meets the criteria called for by the test plan and can reserve this system to prevent contention from other test jobs and users. The TAT Master ensures multi-user capability and execution of multiple test cases. The Daemon is multithreaded, which means it can run several incoming jobs in parallel no matter where they come from. This ensures parallel test case execution on the same system for different approaches.

The method (and system) of certain exemplary embodiments of the present invention provide a combination of several features implemented in one management system.

The several features include: (1) load balancing across a farm of test servers (e.g., if there are at least two test cases and at least two machines where these tests can be executed, then the system distributes one test case to one machine. The distribution works automatically without any manual input of hostnames or IP addresses), (2) automatic interpretation of a complicated test plan (this means that the corresponding hardware where a test case can be executed is searched automatically), (3) the ability to re-drive a failed test case to another system (e.g., if test case A failed on a Windows box, then re-drive it on a Linux box), (4) multi-threaded manager (this provides maximum usage of multi-core hardware), and (5) platform independency.

Existing solutions fail to provide at least one of the above capabilities.

For example, as discussed above, ABAT is a server-client principle, where the server provides a Web-GUI where jobs can be submitted. The clients run on the hardware where the jobs are done. These submitted jobs define a test case and a machine where the job has to be executed.

Accordingly, the ABAT system opposes features (1) and (2) mentioned above, because if a job is going to be submitted, the IP address has to be entered. Also, if a user must enter an IP of the machine where a job should run, then there is no possibility to automatically load balance with multiple available hardware.

Furthermore, ABAT is a framework which provides sequential run-possibilities on single hardware, which also opposes feature (4) mentioned above. Accordingly, ABAT fails to provide a combination of each of the features described above.

Moreover, as mentioned above, Grid Access Manager software delivers a virtualization and data-protection layer that creates a unified, fixed-content storage interface across multiple facilities and heterogeneous storage hardware. The virtualization, however, is visible for all kinds of NFS/CIFS or HTTP applications, which are not shielded from each other. Test cases need to have the possibility to run exclusively. Therefore, locking mechanisms must be available for single instances of jobs.

The virtualization of the Grid Access Manager cannot provide the locking mechanisms. Accordingly, the Grid Access Manager technique does not provide feature (1) described above.

In accordance with certain exemplary aspects of the present invention, a system and method is provided in which a combination of the above features is implemented in a single management system.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 6 illustrates the format of a job file in accordance with an exemplary method of the present invention;

DETAILED DESCRIPTION OF EXEMPLARY EMBODIMENTS OF THE INVENTION

Figure 1:
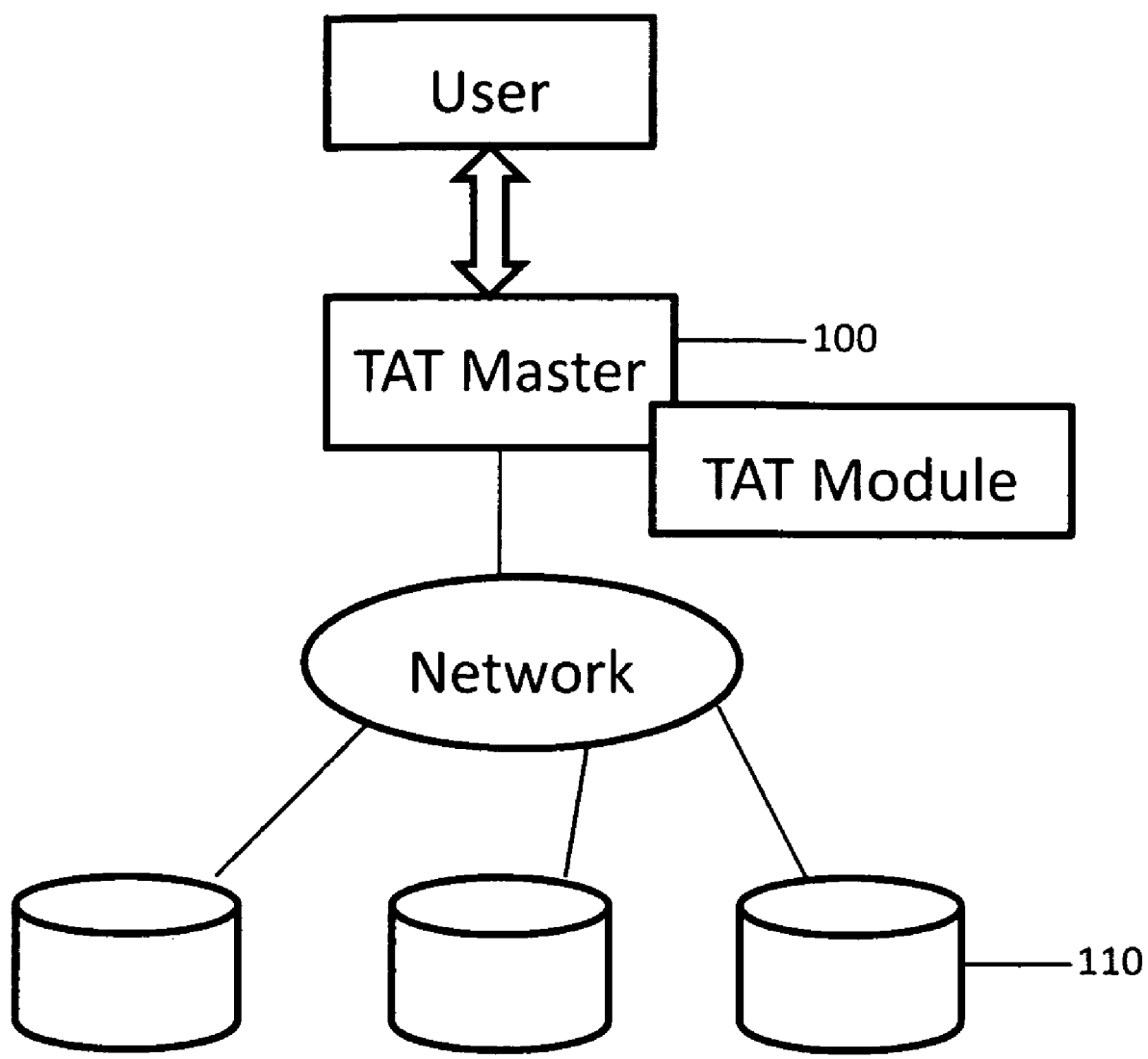
FIG. 1 illustrates components of a system in accordance with certain exemplary aspects of the present invention.

Referring now to the drawings, and more particularly to FIGS. 1-12, there are shown exemplary embodiments of the method and structures according to the present invention.

As described above, and further illustrated in FIG. 1, the system provides two components, a Master controller 100 and execution agents, which can be deployed on a pool of test servers 110. This is a client-server-concept where the Task Automation Tool (TAT) Master is the controller and the TAT Daemon is the execution agent. The load balancing is achieved by selecting an available system from the server pool which meets the criteria called for by the test plan, and can reserve this system to prevent contention from other test jobs and users. The TAT Master ensures multi-user capability and execution of multiple test cases. The Daemon is multi-threaded, which means it can run several incoming jobs in parallel no matter where they come from. This ensures parallel test case execution on the same system for different approaches.

The load balance itself is solved in a combination of a multi-threaded environment and locking/unlocking mechanisms. The locking mechanisms are optional. If the locking mechanisms are enabled, then the test system is dedicated for a single test. If, however, the locking mechanisms are disabled, then two or more different tests can be run on one and the same system (e.g. TDP for Oracle & B/A Client tests). Assuming locking is enabled and after a test system is found, then this will be locked. That means it will be unavailable for other threads. If a test system is found which already was locked before, then another test system needs to be found.

Since multiple threads are run, the locking mechanisms are thread-safe implemented. That is, several parallel running threads with the same test system requirements will not test on the same system. The work of the parallel threads will be done on another system (i.e., load balance).

After a job (e.g. test case) is done, then the locked test system will be unlocked automatically. Accordingly, the unlocked test system will be available for new tests. Assuming locking is disabled, then the load will be balanced automatically to the entire farm of test systems without any locking/unlocking.

Each test system running an execution agent is associated with various attributes that can be matched with attributes contained in the test plan, which are used in determining the appropriate system on which to execute a test job. Most of the attributes are determined automatically, such as operating system type/level, hardware architecture, etc. The system also supports user defined attributes, which allow customization to other variables, which may apply to a given product under test.

To ensure that a test system corresponds to the requirements, an interface is defined, which describes several user variables, including but not limited to, platform (e.g. "pSeries", "Solaris x86"), the operating system (e.g. "AIX", "SLES"), the operating system level (e.g. "5.3", "6.1"), the bitlevel (e.g. "32", "64"), the filesystem (e.g. "JFS2", "NTFS"), the filesystem version (e.g. "3.1", "4.0"), and additional user variables, which can be added dynamically. The interface also describes a return value, which is the hostname of the corresponding machine.

The system provides a mechanism for analyzing failed test jobs to identify some common failure types which represent re-driveable conditions. In these cases, the job is automatically resubmitted to another test system to bypass the failure.

The re-drive ability also is done using the interface dynamically. A test manager usually is able to schedule test cases on needed platforms, which are then executed. In several situations it is necessary to re-drive a test case to test it under different circumstances or because of a failure.

For example, if a test case ran on the 32 bit system and now it should run on a 64 bit system, then only one parameter in the interface needs to be changed and then this test case can be rescheduled in the test manager. Also, servers (e.g., TSM servers) can be mentioned in this interface in the dynamic user variables. The re-drive ability is added to the test manager, which can be used dynamically.

The test manager itself is written in Perl, which is available for all common MS Windows, UNIX/Linux systems and their derivatives. Details are described in section #3.

This system is not limited to test cases only. That is, the system can be applied outside of test situations (e.g. build environment, system setup, etc.).

Figure 2:
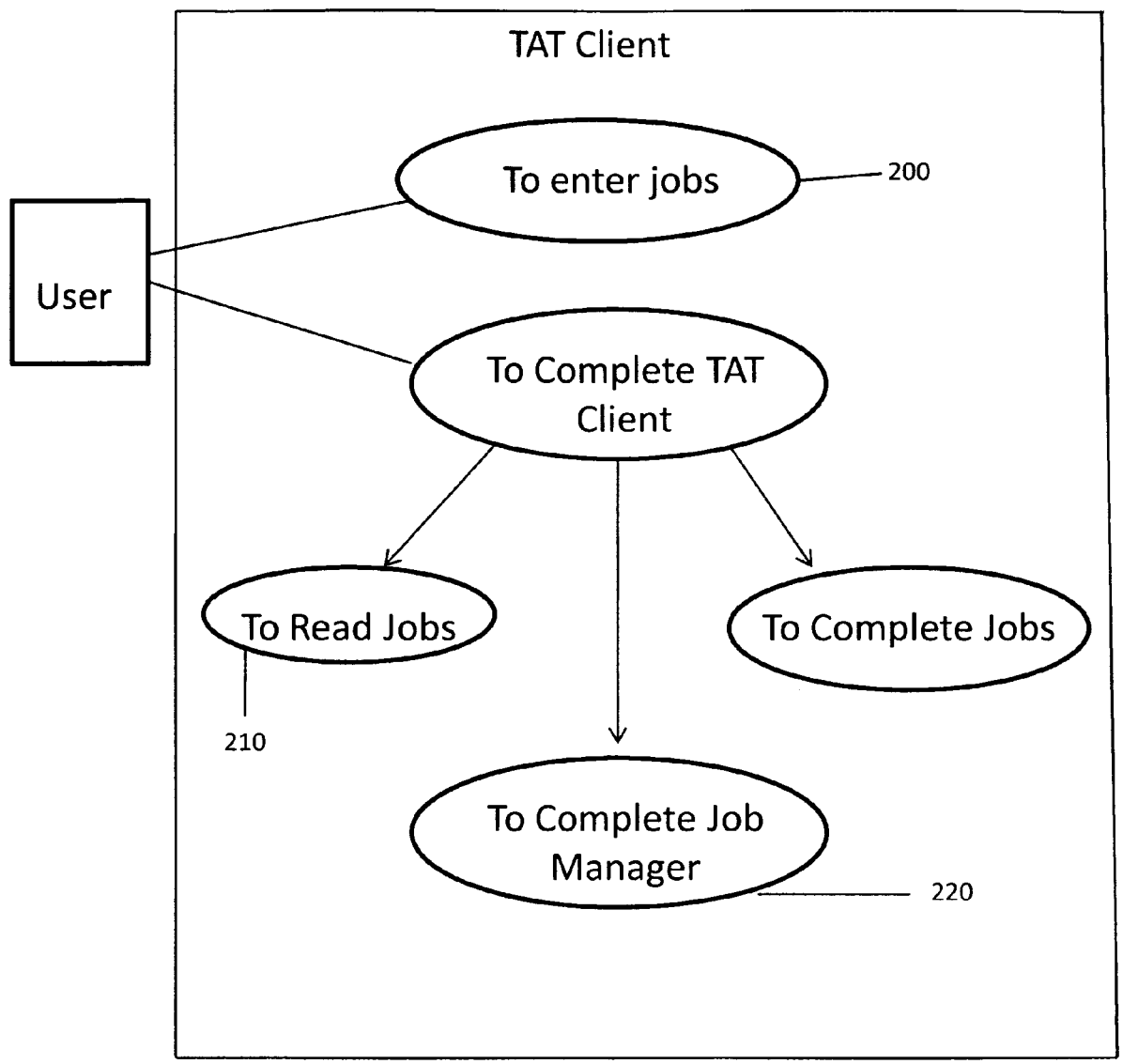
FIG. 2 illustrates the scheduling of jobs in accordance with an exemplary method of the present invention.

In a first step, according to an exemplary method of the present invention, illustrated in FIG. 2, the user schedules jobs. The user enters the job 200 in a central job file. This job file has a predefined format on which the user applies.

The TAT Master reads 210, in regular intervals, the content of the job files. The reading of job files occurs in an internal component called the Jobfileparser, to put an interface between the TAT Master and the format of a job file. A later modification of the job file does not affect this interface, so only the Jobfileparser itself needs to be changed.

Then, another component, the Job manager, is started 220. The Job manager is responsible to deliver jobs which can be executed. The Job manager itself doesn't start the jobs by itself. The intelligence of the jobmanager is encapsulated and can be modified without necessary changes outside the Jobmanager. If the Jobmanager delivers more than one job, then these usually are started in parallel.

Figure 3:
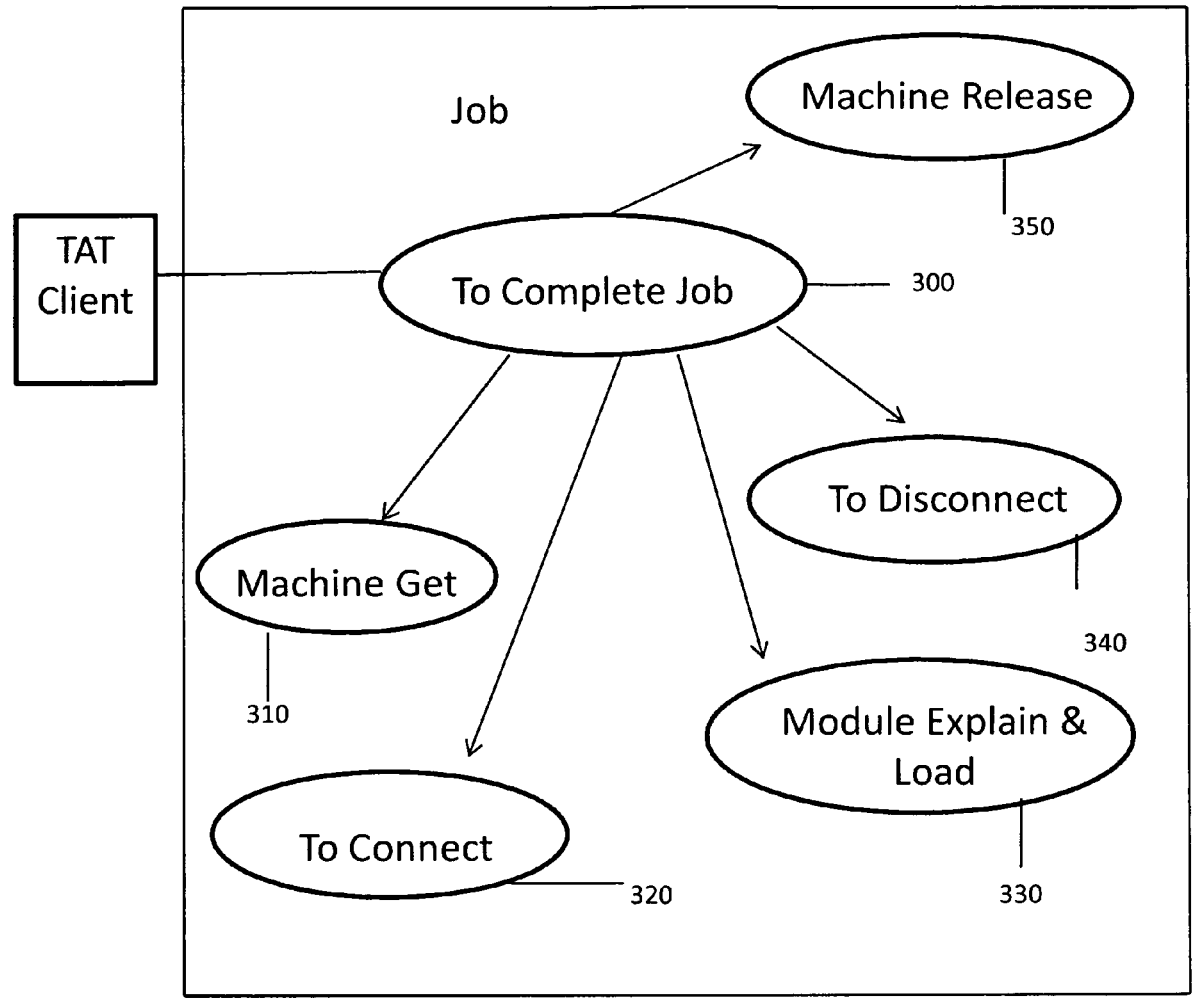
FIG. 3 illustrates the execution of the scheduled jobs in accordance with an exemplary method of the present invention.

FIG. 3 illustrates how the jobs may be executed.

A job is started 300 from TAT Master. At first the job gets a machine 310 (hostname) where this job should be run. Therefore, the "getmachine" module transfers the platform to a hostname. The module "getmachine" is responsible to deliver hostnames according to the defined platforms where the job should run. "getmachine" is a TAT internal module which is run with every job. Optionally it is also responsible to lock the machine exclusively. The user itself is responsible for the content in the getmachine module. The getmachine module just provides an interface to TAT regarding hostname delivery and machine locking. The implementation itself is done from the user.

Next, the connection 320 to this hostname is established. Then, the module is loaded 330. Every name of a module corresponds to the name of the scenario of the job. For example, Job "test123" on AX requires a TAT module called "test123.pl". Then, the module can communicate using the established connection to execute everything which is mentioned in this module. Only the module itself has the intelligence and knows what is required to execute to accomplish the job.

After the module is done, the connection is closed 340, because there is no further communication necessary. Finally, if the machine was locked from the getmachine module, then it is released, to make it available for other executions.

The getmachine is able to manage and ensure that only one job is being executed at a time on a machine. A general lock can be set and released on a machine. The machine that is to be locked (or released) can be specified by a hostname or else the module will find a machine that matches the specified platform. Its interface is described as follows:

filename: getmachine.pl
function: GetMachine ( )
parameters:
   1. Required name: individual string of the machine requester. e.g. Peter
   2. Required platform: hostname or an alias for a group of platforms: sol, solx86, hprisc, lnx86, ln390, . . .
   3. Optional alias_platforms: all specified platforms for the alias, separated by a ";"
return: hostname of a machine which was locked or value which contains string "ERROR"
filename: getmachine.pl
function: FreeMachine ( )
parameters:
   1. Required machine: hostname of the machine which was locked and should be freed now.
return: none The TAT Master is able to work without the getmachine module, but with a large pool of machines, an implementation of the getmachine module is important to provide a better functionality of the TAT Master. The system works without the getmachine module by indicating the real DNS hostname or IP address at the platform column in the job file and setting the value locking in the TAT Master configuration file to 0.

Figure 4:
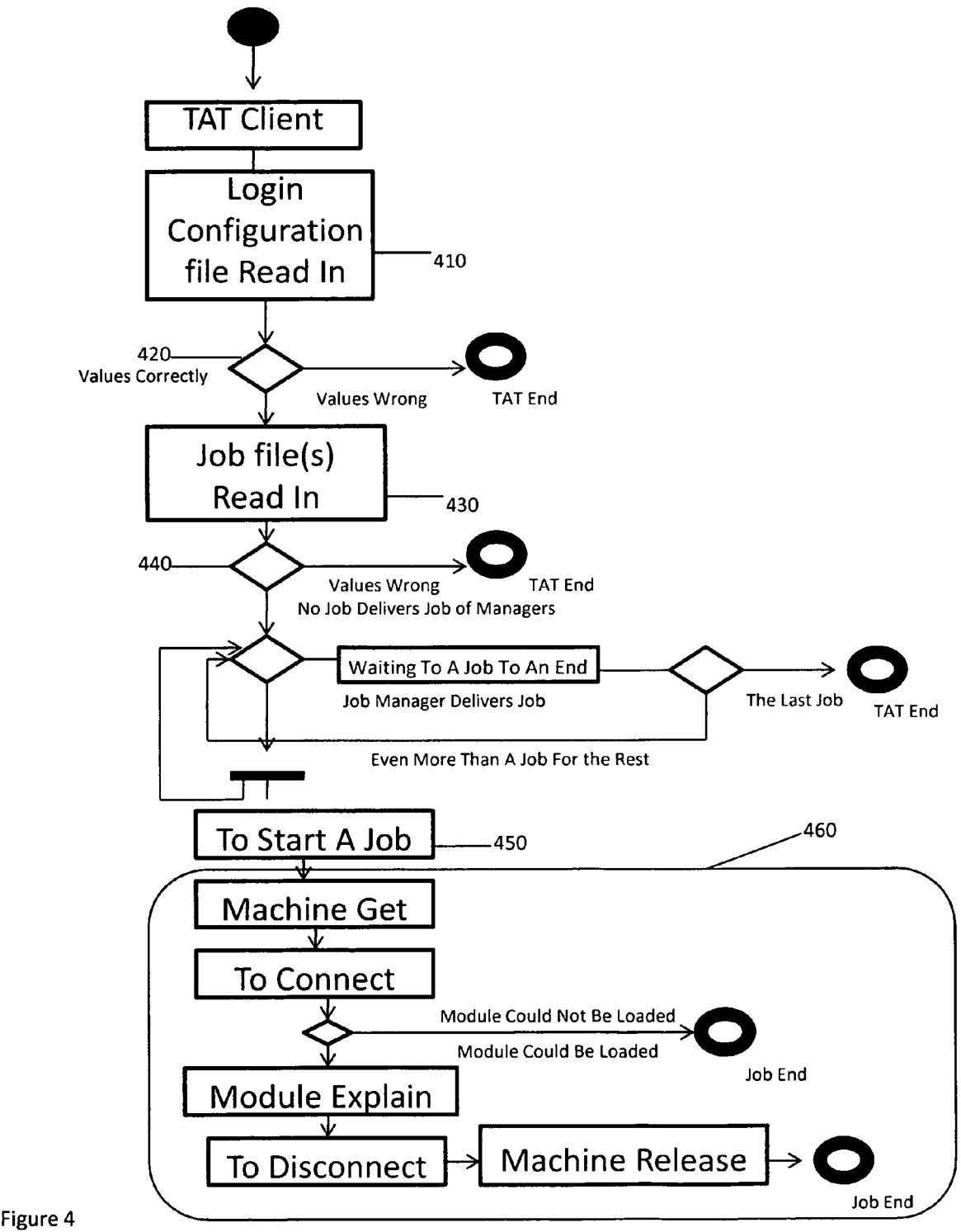
FIG. 4 further illustrates the execution of the scheduled jobs in accordance with an exemplary method of the present invention.
Figure 5:
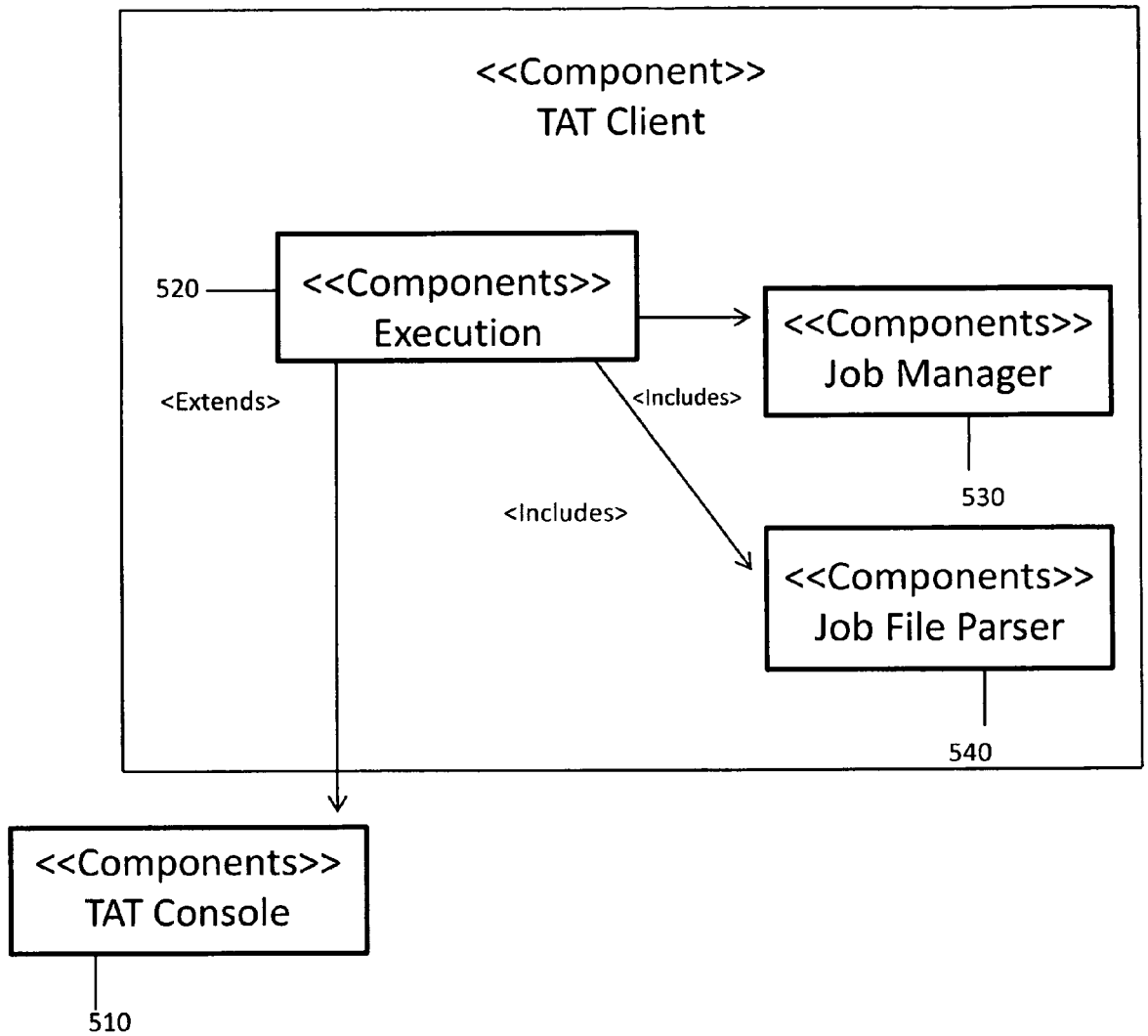
FIG. 5 illustrates a block diagram of components of a test management system 500 in accordance with certain exemplary embodiments of the present invention.

FIG. 4 illustrates the process described above. Specifically, after the TAT Master is started, the configuration file, which has several adjustments for the TAT Master, will be read/imported 410. During reading, the system will determine if the data in the configuration file is correct 420. If some invalid data is found, then the TAT Master exits, otherwise the content from the job files are imported.

Next, the system reads in a job file (or job files) 430. The system checks the data to determine if the data is valid 440. If invalid data is found, then the TAT Master exits. If all of the data is valid, then the Jobmanager is started. The Jobmanager then delivers one job or no jobs.

If the Jobmanager delivers a job, then, the next Jobmanager is started and the delivered job is started immediately 450. As mentioned above, then a hostname is delivered, a connection is established and the job is done. If there is a failure during job startup (e.g. the corresponding module is missing) then the job returns as failed.

If the Jobmanager delivers no job that means that all jobs are currently running or the requirements for a job are not available (e.g. all Linux systems are locked or busy).

Whether the module of the job was successful or was not successful the job is finished anyway. After ending of the execution, the TAT Master is ready to accept new jobs from the user.

FIG. 4 also again illustrates the process 460 for executing a job, as explained in detailed with respect to FIG. 3.

FIG. 6 illustrates a component diagram describing the relationship of the components in a test management system 500 according to certain exemplary embodiments of the present invention. The console 510 is responsible to transfer user activity to the TAT Master 520. The TAT Master component works directly with the Jobmanager 530, which delivers the jobs and with the Jobfileparser 540, which parses the job files to valid jobs, which can be used from the Jobmanager.

In accordance with certain exemplary embodiments of the present invention, the job file is an XML file, having a format as illustrated in FIG. 6.

A job file consists of following data:

Required "ID". The system specifies an unique ID for every job. This is useful if another job has a reference to this job. According to the communication with the TTT Database, the ID of an Execution Record from TTT Database is used to distinguish different Execution Records.

Required "Scenario". Name of the module which will be executed. It has to exist in the modules directory.

Optional "Version". Version of the application to be tested. Any format is accepted.

Required "Platform". Either Hostname or IP Address of the machine where TAT Daemon runs, or just an alias for a collection of many platforms, described later in alias_platforms.

Optional "OS Level". Version of the operating system where TAT Daemon runs. Any format is accepted Optional "Interface". Interface of the application. Any format is accepted.

Optional "Client". Name of the application. Any format is accepted.

Optional "Reference". Reference to another ID. If a job has a reference to another job, the job will be executed after the referenced job passed his own job.

Optional "Tester". The tester name of the tester, who wants to execute this job.

Optional "Client Driver". The driver version the scenario should be tested with.

Optional "Alias_Platforms". All platforms for a platform alias have to be listed here. For example, if there is a platform alias "Linux86" the system may use here "LNX86_SLES10_32_GPFS3.1" as a specified platform.

Figure 7:
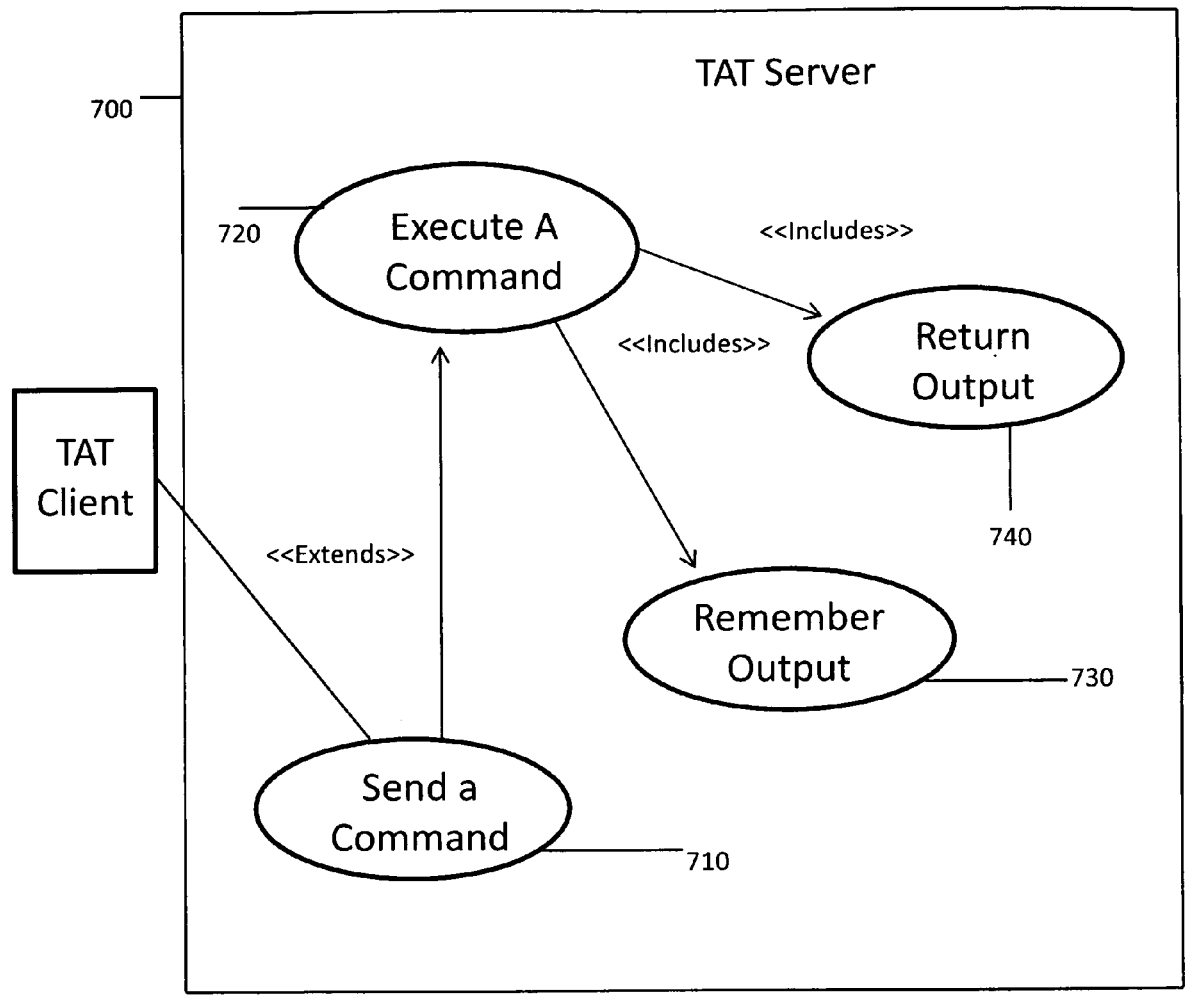
FIG. 7 illustrates a Daemon (TAT server) in accordance with an exemplary method of the present invention.

FIG. 7 illustrates a Daemon (a TAT server) according to certain exemplary embodiments of the present invention.

The TAT Daemon 700 is to be able to receive commands from the TAT Master, to execute them and to return its output to the TAT Master. The development of a TAT Daemon, which supports the necessary features, is explained in FIG. 7.

After starting, the TAT Daemon runs in a waiting condition. However, the TAT Daemon takes first action when a TAT Master establishes a connection. After a successful connection, the TAT Master sends a command 710 to the TAT Daemon which is then executed 720. This command is executed in an own shell of the Daemon. This means that environment variables are also kept in this environment. The Daemon remembers 730 the produced output and returns 740 it to the Master.

Figure 8:
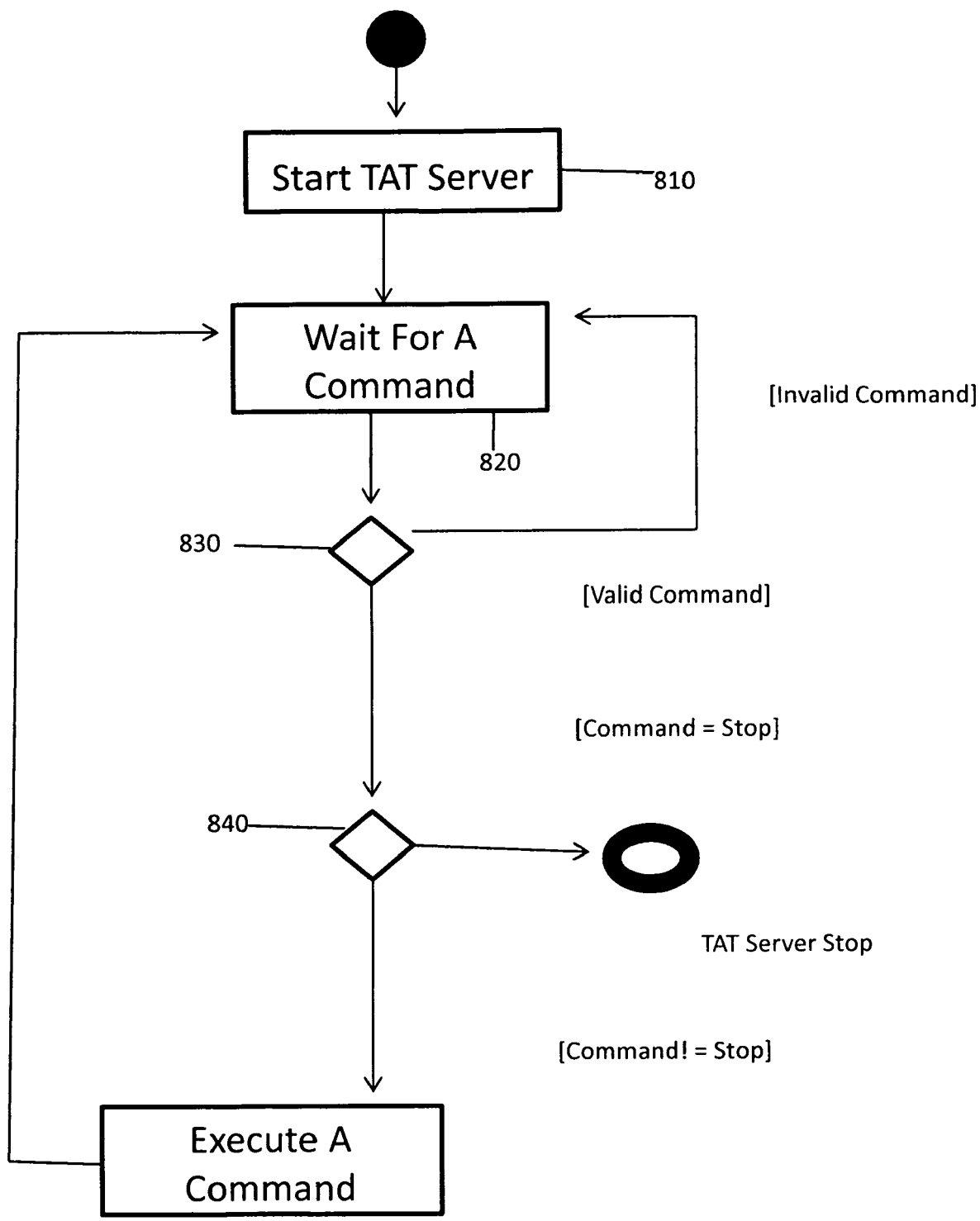
FIG. 8 illustrates an operation of the Daemon (TAT server) in accordance with an exemplary method of the present invention.

As illustrated in FIG. 8, after starting 810, the TAT Daemon waits for action 820 from the TAT Master. As soon as there is a connection between the Master and the Daemon, the system checks if the command is valid 830. The TAT Daemon only responds if they transferred values are valid. As soon as this task has been worked off, the Daemon again waits for the Master. To stop the TAT Daemon, the Client sends a particular command, which leads to the self-closing of the TAT Server 840.

Figure 9:
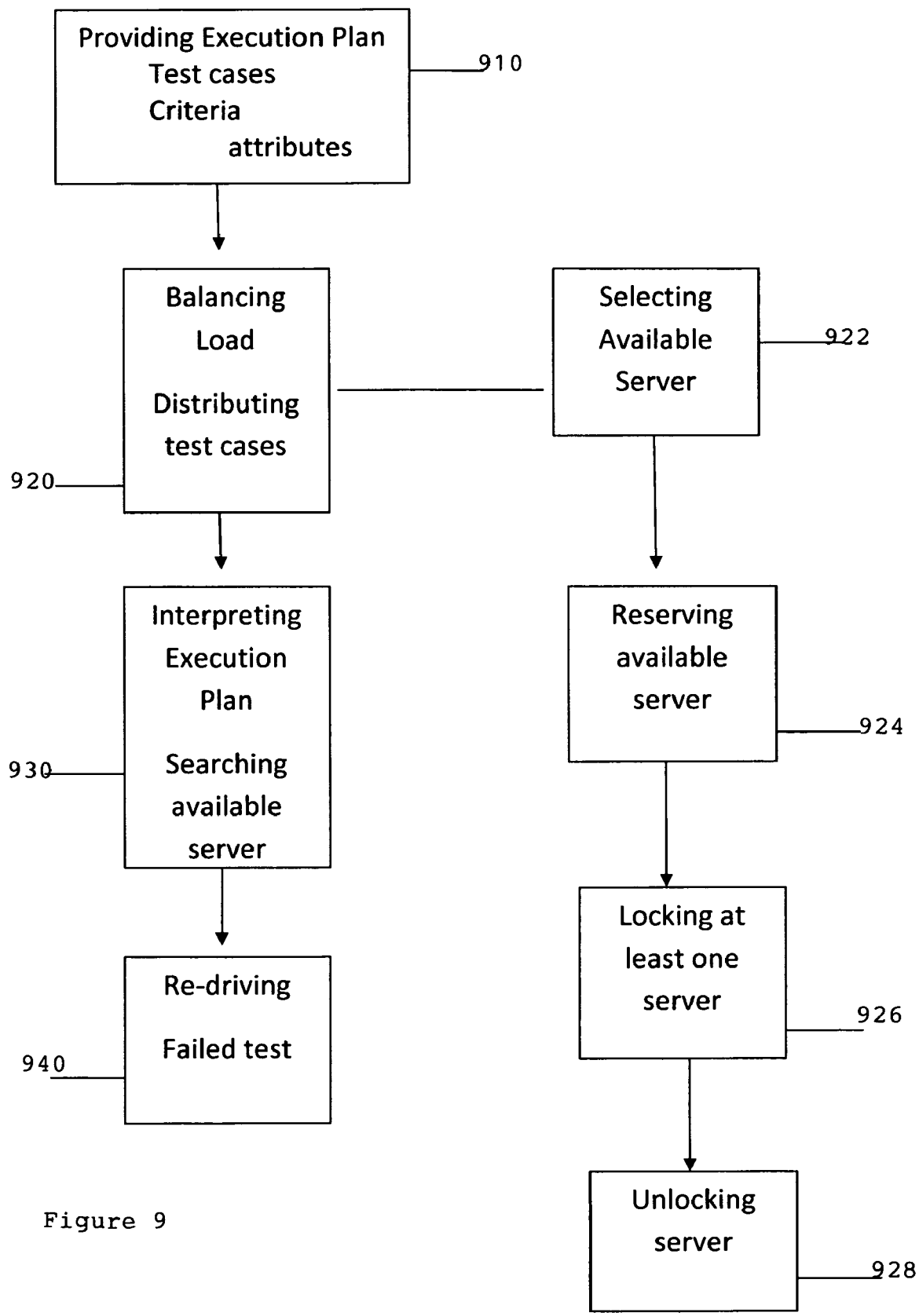
FIG. 9 illustrates a method 900 according to certain exemplary embodiments of the present invention.

FIG. 9 illustrates a flow diagram of an execution management method 900 for testing a product on a plurality of platforms, according to certain exemplary embodiments of the present invention.

The method 900 includes providing an execution plan 910, balancing 920 an execution load across a plurality of servers, automatically interpreting 930 the execution plan, and re-driving 940 a failed test to another of the plurality of servers.

The execution plan includes a plurality of test cases and criteria corresponding to each of the plurality of test cases. The criteria include system attributes and user defined attributes. The automatically interpreting 930 the execution plan includes automatically searching for the available server. The available server is selected based on the automatic searching.

The load balancing 920 includes automatically distributing the plurality of test cases to the plurality of servers. The automatic distribution includes selecting 922 an available server from a plurality of servers, reserving 924 the available server to prevent contention from other test cases, locking 926 at least one of the plurality of servers, whereby if a server is locked, then the server is dedicated to a single test case, and if the server is unlocked, then a plurality of test cases may be run on the server, and automatically unlocking 929 a selected server once a test case has been tested on the selected server. The available server meets the criteria of the execution plan, for testing at least one of the plurality of test cases. The selection 922 of an available server includes matching attributes of a server with the criteria of the execution plan.

The test case is re-driven another of the plurality of servers if the test case fails on an originally selected available server. This describes two different meanings. First, if there is a failure on a system where the test case is not performed, for example, the TSM server might have crashed causing failure, but a retry using a different back-end server will be successful. Second, if, for example, a corrupted test file system on the system where the test case is performed causes the test to fail, another test system with correct file systems may be successful.

The automatic interpretation 920 of the execution plan includes mapping the multiple user defined variables to available test systems, which meet the requirements of the execution plan. By allowing user defined variables, unique characteristics of specific products can be handled.

According to certain exemplary aspects of the present invention, more than one of the plurality of test cases may be run on each of the plurality of servers at a same time in parallel. This is possible because of the multi-threaded manager and test agents, discussed above.

Furthermore, according to another exemplary aspect of the present invention each of the plurality of servers is run independently. This is an advantageous feature through almost all Windows systems and Unix/Linux systems, as well as their derivates. No other known systems provide the platform independency of the present invention.

Figure 10:
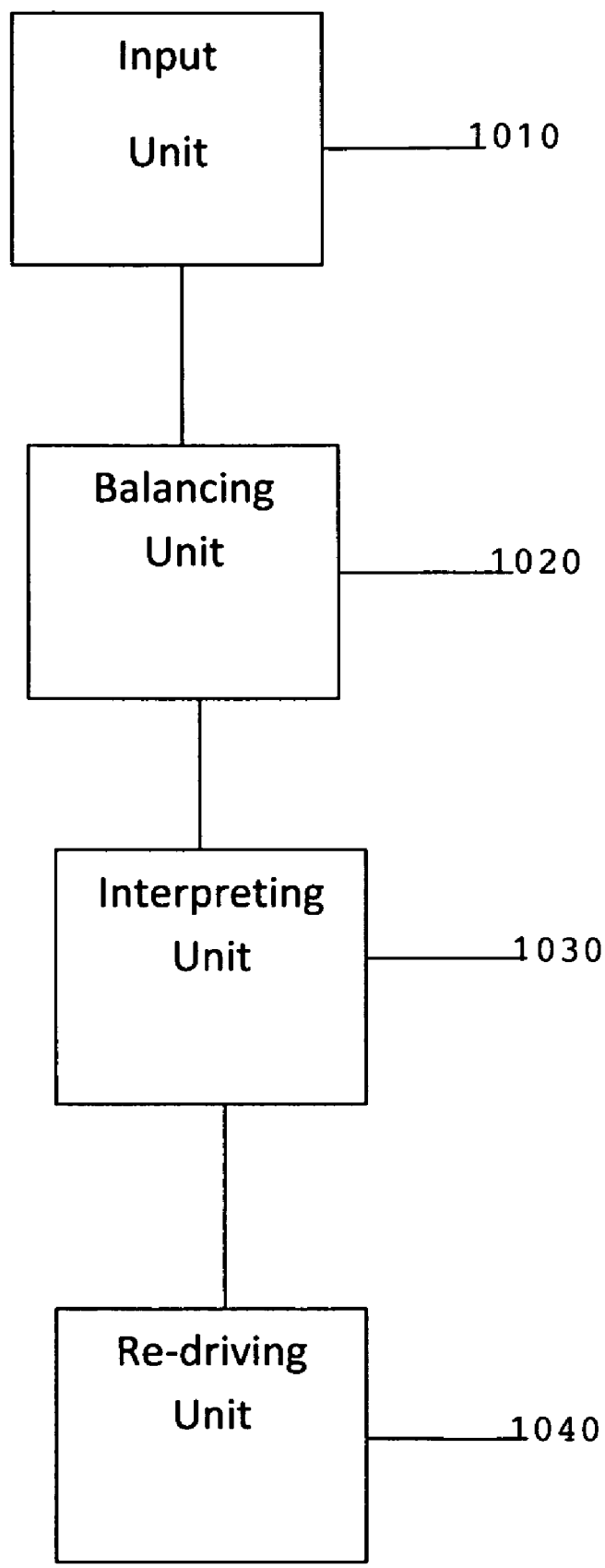
FIG. 10 illustrates a block diagram of a system 1000 according to certain exemplary embodiments of the present invention.

FIG. 10 illustrates a block diagram of an execution management system 1000 for testing a product on a plurality of platforms, according to certain exemplary embodiments of the present invention.

The system 1000 includes an input unit 1010, a balancing unit 1020, an interpreting unit 1030, and a re-driving unit 1040. The input unit 1010 provides the execution plan. The balancing unit 1020 balances an execution load across a plurality of servers, according to the method described above. The interpreting unit 1030 maps multiple user defined variables to available test systems, which meet the requirements of the execution plan. The re-driving unit 1040 re-drives a test case to another of the plurality of servers if the test case fails on an originally selected available server.

Figure 11:
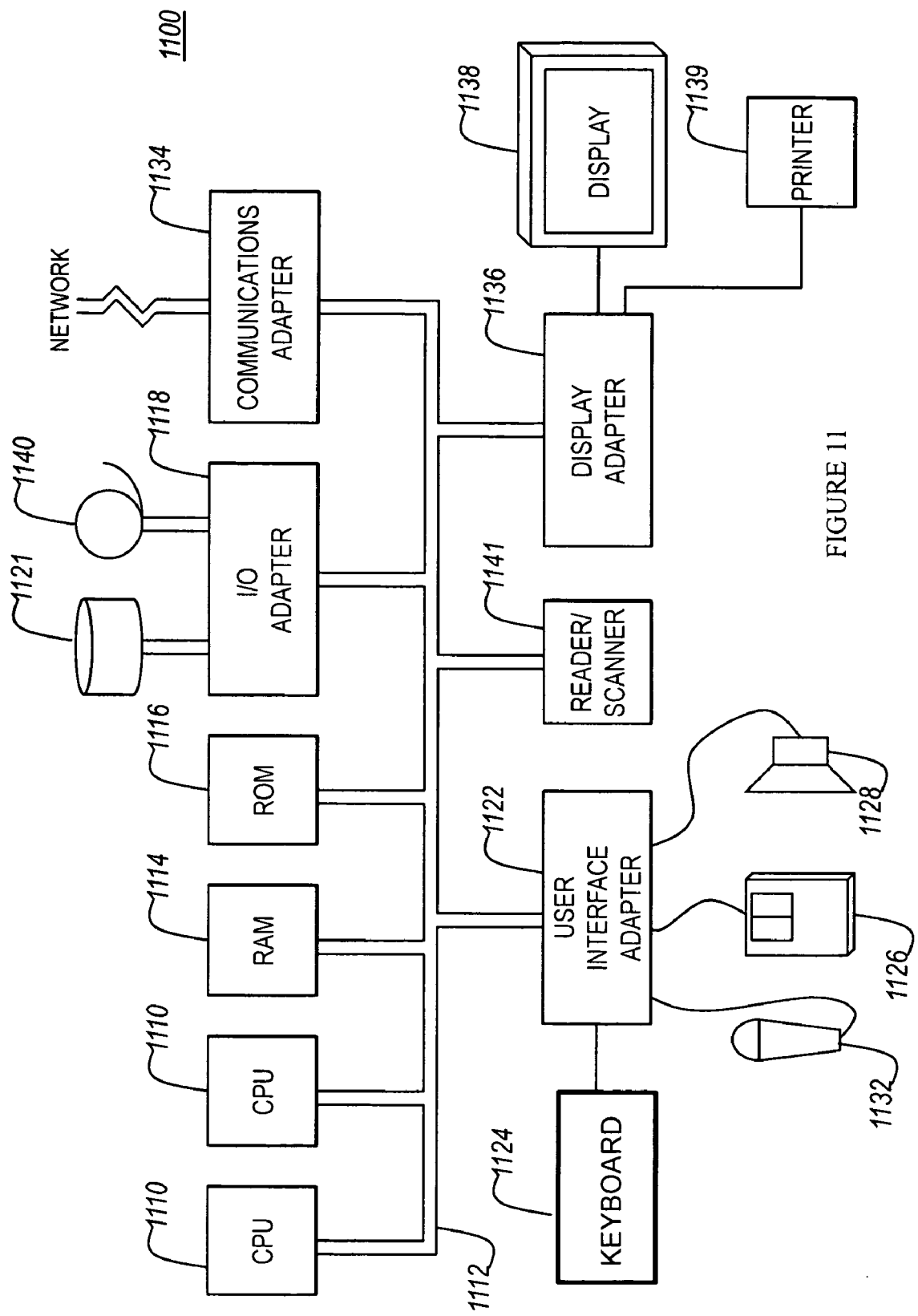
FIG. 11 illustrates an exemplary hardware/information handling system 1100 for incorporating the present invention therein.
Figure 12:
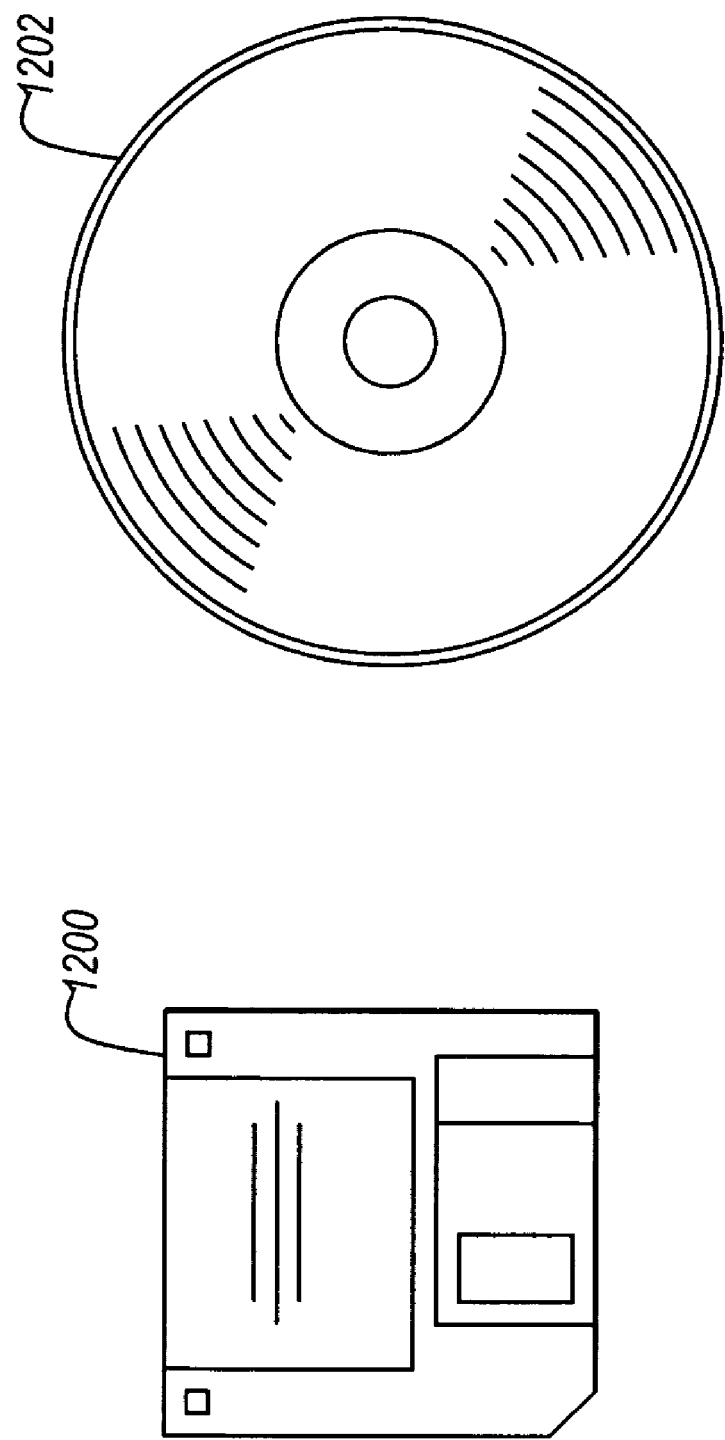
FIG. 12 illustrates a storage medium 1200/1202 for storing steps of a program of a method according to certain exemplary embodiments of the present invention.

FIG. 11 illustrates a typical hardware configuration 1100, which may be used for implementing the inventive cursor control system and method of controlling a cursor. The configuration has preferably at least one processor or central processing unit (CPU) 1111. The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1024, mouse 1126, speaker 1128, microphone 1132, pointing stick 1127 and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method.

Such a method may be implemented, for example, by operating the CPU 1111 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 1111 and hardware above, to perform the method of the invention.

This storage media may include, for example, a RAM contained within the CPU 1111, as represented by the fast-access storage for example. Alternatively, the instructions may be contained in another storage media, such as a magnetic data storage diskette 1200 or compact disc 1202 (FIG. 12), directly or indirectly accessible by the CPU 1111.

Whether contained in the computer server/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C+, etc.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. An execution management method for testing a product on a plurality of platforms, comprising:
    providing an execution plan, the execution plan including a plurality of test cases and criteria corresponding to each of the plurality of test cases, said criteria including system attributes and user defined attributes;
    balancing an execution load across a plurality of servers, said load balancing comprising automatically distributing the plurality of test cases to the plurality of servers, said distributing comprising:
        selecting an available server from a plurality of servers, the available server meeting the criteria of the execution plan, for testing at least one of the plurality of test cases, said selecting an available server comprising matching attributes of a server with the criteria of the execution plan;
        reserving the available server to prevent contention from other test cases;
        locking at least one of the plurality of servers, whereby if a server is locked, then the server is dedicated to a single test case, and if the server is unlocked, then a plurality of test cases may be run on the server; and
        automatically unlocking a selected server once a test case has been tested on the selected server;
    automatically interpreting the execution plan, said automatically interpreting comprising automatically searching for the available server, the available server being selected based on said automatically searching; and
    re-driving a failed test to another of said plurality of servers if the test case fails on an originally selected available server,
    wherein more than one of said plurality of test cases may be run on each of said plurality of servers at a same time in parallel, and
    wherein each of the plurality of servers is run independently.

\* \* \* \* \*